A. H. SEELEY.
MOVING PICTURE MACHINE.
APPLICATION FILED MAR. 3, 1919. RENEWED NOV. 12, 1920.

1,383,571.

Patented July 5, 1921.
3 SHEETS—SHEET 1.

Arthur H. Seeley
Inventor.

By Miles R. Stevens &Co.
Attorneys

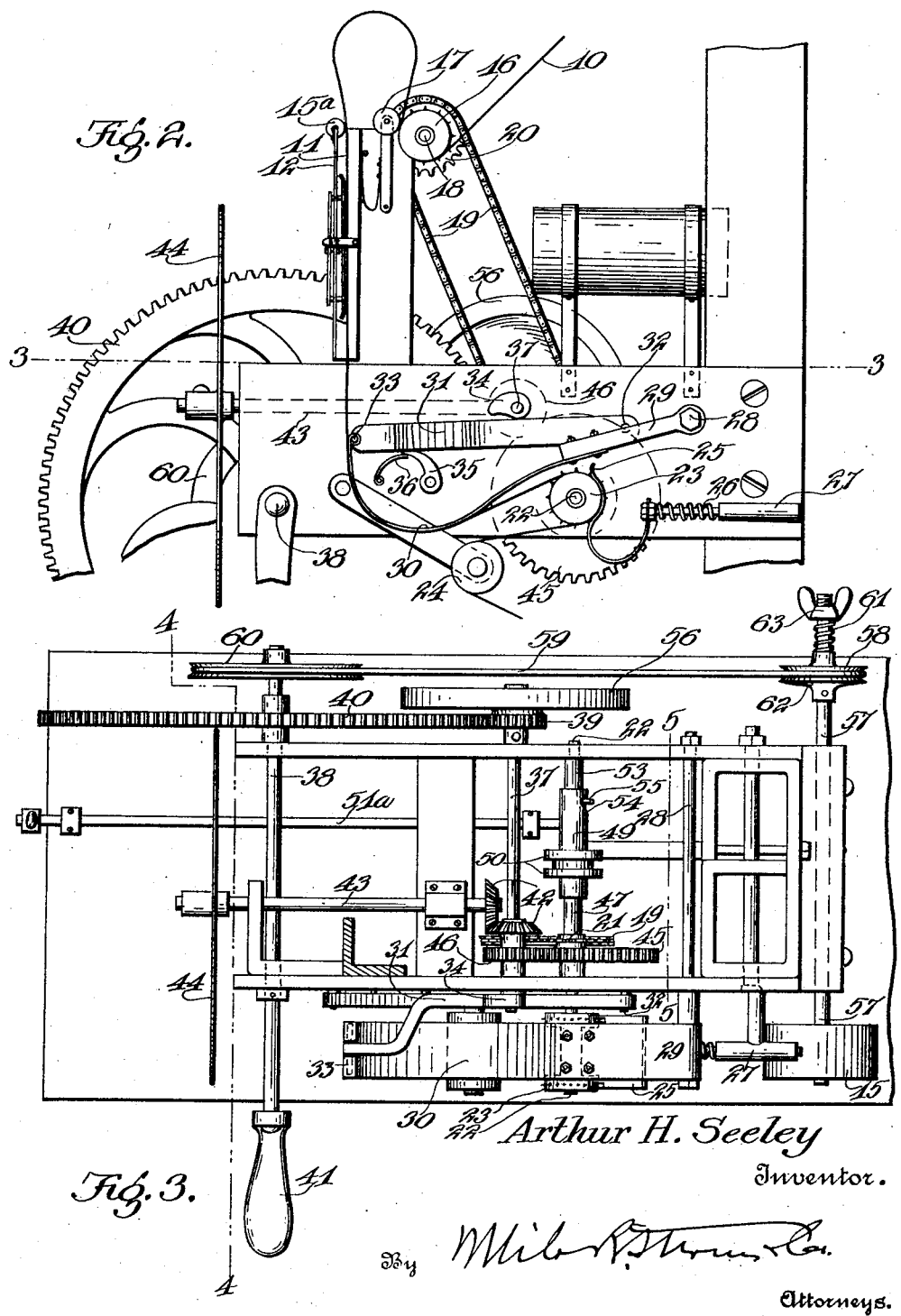

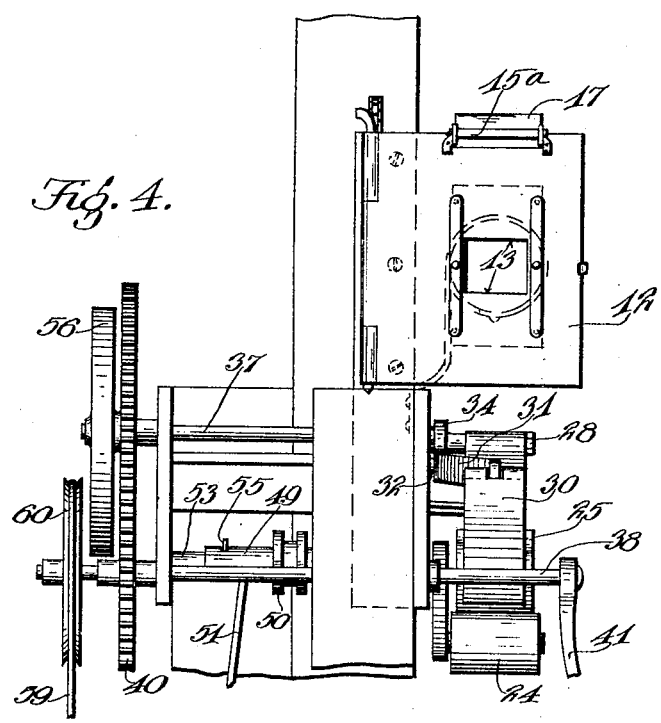

UNITED STATES PATENT OFFICE.

ARTHUR H. SEELEY, OF CHICAGO, ILLINOIS, ASSIGNOR TO EDGAR R. SEELEY, OF CHICAGO, ILLINOIS.

MOVING-PICTURE MACHINE.

1,383,571.     Specification of Letters Patent.     Patented July 5, 1921.

Application filed March 3, 1919, Serial No. 280,285. Renewed November 12, 1920. Serial No. 423,758.

*To all whom it may concern:*

Be it known that I, ARTHUR H. SEELEY, a citizen of the United States, residing at Chicago, in the county of Cook and State of Illinois, have invented new and useful Improvements in Moving-Picture Machines, of which the following is a specification.

This invention relates to moving picture machines in which the film is advanced intermittently past the exposure opening by means of an oscillating member instead of by a sprocket and star wheel, the machine being therefore of the beater type.

The object of the invention is to provide a novel and improved means for forming a loop in the film below the exposure opening, and by such means produce an intermittent motion of the film past the exposure opening. The mechanism is so constructed and arranged that there is no danger of injury to the film or wear of the sprocket holes thereof, thereby saving and prolonging the life of the film, and the operation of the oscillating loop-forming member or beater is such that a clear and steady picture is produced.

With the object stated in view, the invention consists in a novel combination and arrangement of parts to be hereinafter described and claimed and in order that the same may be better understood, reference is had to the accompanying drawings forming a part of this specification.

The preferred embodiment of the invention has been illustrated, but it will be understood that various changes and modifications may be made without a departure from the spirit and scope of the invention as claimed hereinafter.

In the drawings,

Fig. 2 is an enlarged elevation of the main parts of the machine;

Fig. 3 is a horizontal section on the line 3—3 of Fig. 2;

Fig. 4 is a cross section on the line 4—4 of Fig. 3, and

Fig. 5 is a longitudinal section of a framing mechanism.

Figure 1:
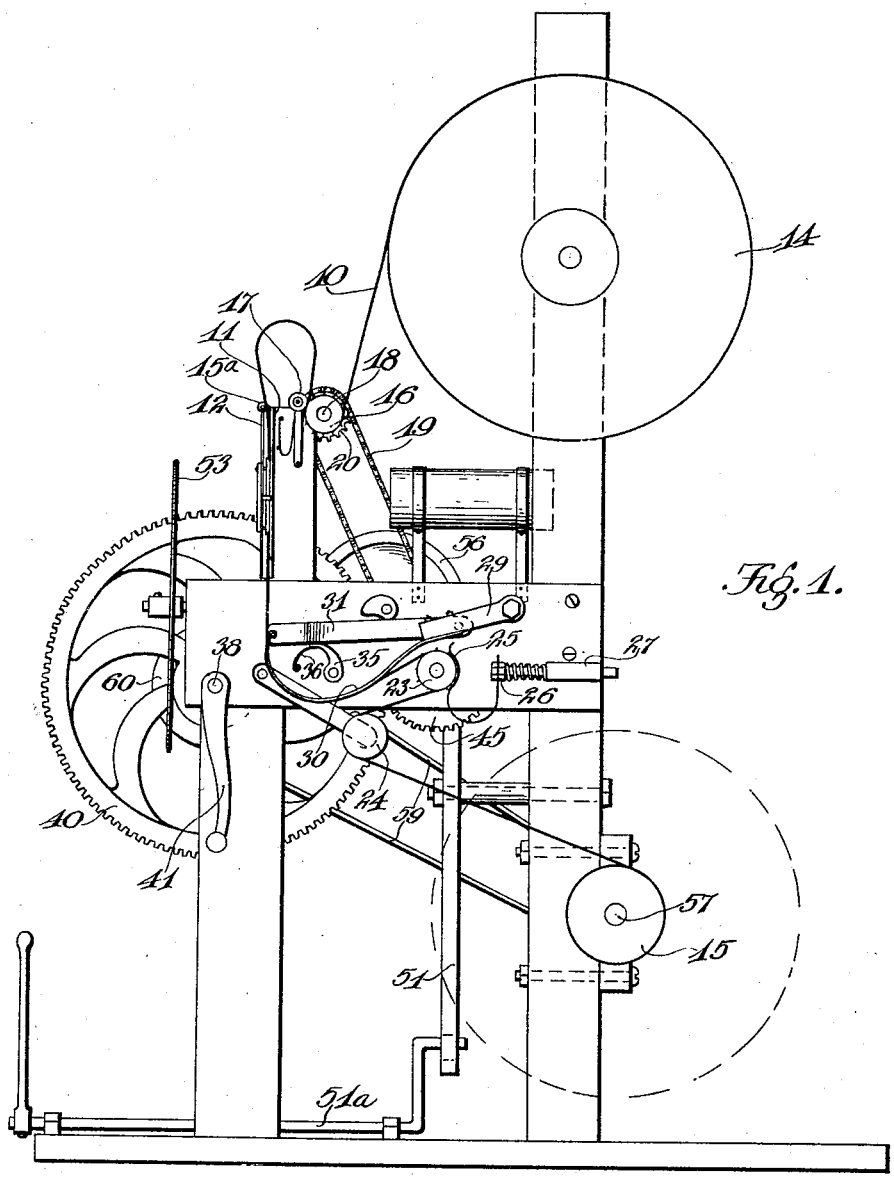
Figure 1 is an elevation of the machine.

Referring specifically to the drawings, 10 denotes the film which passes between a face plate 11 and a gate 12, and is advanced intermittently past the exposure opening 13 thereof. The film is unwound from an upper reel 14 and wound on a lower reel 15. These parts, except as hereinafter noted, are arranged in the ordinary manner and a detailed description thereof is therefore not necessary.

At the top of the gate 12 is a guide roller 15ª for the film, and adjacent to the reel 14 is a feed sprocket wheel 16 under which the film passes and against which it is held by a spring-pressed roller 17. The sprocket wheel 16 is on a shaft 18 which is driven by a chain 19 passing over a sprocket wheel 20 on said shaft and obtaining motion from a sprocket wheel 21, which latter is associated with a shaft 22 carrying a take-up sprocket wheel 23 for the film, similar to the wheel 16.

The sprocket wheel 23 is positioned to engage that portion of the film 10 which is between the parts 11 and 12 and the take-up reel 15, and after leaving said sprocket wheel, the film passes over an idler roller 24. The film is pressed against the take-up sprocket wheel 23, and is thus guided, by a plate 25 which is recessed to clear the sprocket and teeth. This tension and guide plate is mounted on a spring-pressed plunger 26 carried by a suitable support 27 mounted on one of the frame members of the machine.

That portion of the film 10 which is between the parts 11 and 12 and the take-up sprocket wheel 23 is formed into a loop, and this looped portion of the film is acted on by an oscillating member or "beater" to advance the film intermittently past the exposure opening 13. This "beater" mechanism comprises the following parts:

A long bolt 28 supports a swinging bracket arm 29 to the outer end of which is fastened one end of a spring metal strip 30 having its other end fastened to the outer end of a lever arm 31 pivoted at 32 to some convenient portion of the frame of the machine. The lever arm has a lateral offset as shown in Fig. 3 over to the strip 30 and it is connected to the latter by a pin 33 carried by the lever and around the projecting ends of which the end of the strip is bent, said end being recessed to accommodate the extremity of the lever arm carrying the pin. The strip is resilient and it extends in a curve or loop between the parts 29 and 31 and fits inside the loop made by that portion of the film 10 which is between the parts 11 and 12 and the sprocket wheel 23. It will therefore be evident that when the strip 30 is moved downwardly it draws the film down, and by giving the strip an intermittent downward stroke, the film is advanced intermittently past the exposure opening 13, the action being similar to that in machines of the "beater" type.

At 34 is shown a rotating cam or wiper for effecting the hereinbefore described working stroke of the "beater" strip 30. This cam is positioned above the arm 31 to engage the edge thereof once every revolution, and press the arm downwardly, and as the strip 30 is fastened to the arm and is pivotally supported by reason of its attachment to the bracket arm 29, the beater is actuated as described. The bottom edge of the arm 31 is engaged by a lifter 35 actuated by a spring 36. This lifter is depressed when the arm is forced down by the cam, and elevates the arm for the next working stroke of the beater strip 30 when the actuating portion of the cam rides off the arm.

The cam 34 is on a shaft 37 obtaining motion from the main drive shaft 38 of the machine through gears 39 and 40, respectively, thereon. A crank handle is shown at 41 for manually operating the shaft 38, but any other operating means, and also power driven means, may be provided. The shaft 37 also drives, through a bevel gearing 42 and a shaft 43, the usual shutter 44.

The sprocket wheel 21 is fixed to or integral with a spur gear 45 which is in mesh with a pinion 46 on the shaft 37 and thus obtains motion from the latter. The parts 21 and 45 are made fast to a sleeve 47 by a set screw or other suitable means 48. The shaft 22 is mounted in the sleeve 47, and is adapted to receive motion therefrom by a coupling device comprising the following parts:

On the sleeve 47 is slidably mounted a collar 49 having an annularly grooved end portion 50 for engagement by a shifter arm 51 having suitable actuating means 51ª as shown in Fig. 1. The collar 49 is coupled to the sleeve 47 to turn therewith, by a key-and-slot or similar slidable connection 52. The sleeve 47 does not extend throughout the entire length of the collar 49 but terminates short of one end thereof, the latter end being entered by a sleeve 53 which is fast on the shaft 22. The collar 49 has an oblique or spiral slot 54 in which works a pin 55 carried by the sleeve 53 and projecting radially therefrom.

It will be evident from the foregoing that when the shifter arm 51 is operated to slide the collar 49 to the right in Fig. 5, the pin 55, through the groove 54, is carried around and as this pin is carried by the sleeve 53, and the latter is fast on the shaft 22, said shaft is given a turn. While the parts are running or still, this action adds an extra length of film to the part appearing on the screen, resulting in the "framing" or height adjustment of the film. The framing mechanism gives the shaft 22 an extra turn to advance the film the extra length through the take-up sprocket wheel 23. The regular feed of the film is obtained by the direct drive of the sprocket wheel shaft 22 through the gear 45, sleeve 47, coupling 52, collar 49 and pin 55. The upper feed sprocket wheel 16 receives motion from the sprocket wheel 21 as hereinbefore described and therefore rotates with the take-up sprocket wheel 23.

On one end of the shaft 37 is a fly or balance wheel 56.

The take-up reel 15 is on a shaft 57 having a grooved pulley 58 which is connected by a belt 59 to a similar pulley 60 on the main drive shaft 38. The pulley 58 is loose on the shaft 57 and is held by a spring 61 in frictional engagement with a disk 62 fixed on said shaft, the tension of the spring being regulated by a nut 63. This yielding coupling between the shaft 57 and the pulley 58 is intended to keep the reel 15 running to take up slack in the film already exposed, but as soon as the film is taut, the pulley 58 overruns the disk 62, so that no strain is placed on the film.

As the sprocket wheels 16 and 23 run continuously when the machine is in operation, any wear in the sprocket wheel teeth is even and uniform, and they do not catch the film sprocket holes and check or break the same, so that the liability of injury to the film is reduced to a minimum. The loop forming device or beater 30 has the shape of a loop in the film, and as it is resilient it engages the film in such a manner that there is no danger of injury of the latter. When the beater is swung down by the cam mechanism hereinbefore described, this being a quick stroke, the film is moved down to the extent of one picture. The film then stops while the sprocket wheel 23 takes up the slack in the film made by the loop, the beater now rising preparatory for the next downward stroke to advance the film another step. By reason of the resiliency of the beater there is but little friction on the film, and by the bowed or looped shape of the beater any difference in the stiffness of the film does not affect the display of the picture. By the framing device, the take-up sprocket wheel 23 can be readily advanced or retarded, and in this manner the relation of the movement of the beater to the movement of the sprocket wheel may be changed to throw the picture higher or lower, and thus proper position it relative to the exposure opening.

The arm 29 is adjustably fastened to the bolt 28 so that its angularity may be changed for adjustment of the looped strip 30.

I claim:

1. In a moving picture machine, an oscillating beater for advancing the film, said beater being resilient and bowed to form the film into a loop, a pivoted support for the beater, a pivoted actuating arm connected to the beater, a rotatable cam engageable with the arm for swinging the same in one direction, and means for giving the arm a return stroke.

2. In a moving picture machine, a film beater comprising a resilient bowed strip, a rigid pivotally supported member to which one end of the strip is attached, a rigid lever arm connected to the other end of the strip, and operating means for the beater.

3. In a moving picture machine, a film beater comprising a resilient bowed strip, a rigid pivotally supported member to which one end of the strip is attached, a rigid lever arm connected to the other end of the strip, and means engageable with said lever for swinging the same to oscillate the beater.

4. In a moving picture machine, a film beater comprising a resilient bowed strip, a rigid pivotally supported member to which one end of the strip is attached, a rigid lever arm connected to the other end of the strip, a rotatable cam on one side of the lever for swinging the same in one direction, and means for swinging the lever in the opposite direction.

In testimony whereof I affix my signature.

ARTHUR H. SEELEY.